United States Patent [19]
Christen et al.

[11] Patent Number: 5,158,231
[45] Date of Patent: Oct. 27, 1992

[54] MINI-SPRINKLER STAKE ASSEMBLY AND MINI-SPRINKLER UNIT AND DEFLECTOR THEREFORE

[75] Inventors: Hans D. Christen, La Verne; Howard E. Thornton, Glendora, both of Calif.

[73] Assignee: Rain Bird Sprinkler Mfg. Corp., Glendora, Calif.

[21] Appl. No.: 719,747

[22] Filed: Jun. 24, 1991

[51] Int. Cl.$^5$ .................. B05B 1/26; B05B 15/00
[52] U.S. Cl. .................. 239/276; 239/280; 239/498; 239/522 DIG. 1
[58] Field of Search ............ 239/273, 276, 280, 282, 239/283, 498, 500, 504, 518, 524, 522, 523, DIG. 1

[56] References Cited

U.S. PATENT DOCUMENTS

| | | | |
|---|---|---|---|
| D. 313,393 | 1/1991 | Brown et al. | D8/356 |
| 3,029,030 | 4/1962 | Dey, Sr. | 239/524 |
| 4,256,262 | 3/1981 | Rosenberg et al. | 239/276 |
| 4,582,258 | 4/1986 | Olson | 239/498 |
| 4,625,915 | 12/1986 | Cockman | 239/524 |
| 4,852,806 | 8/1989 | Zeman | 239/276 |
| 4,869,432 | 9/1989 | Christy | 239/542 |
| 4,944,476 | 7/1990 | Olson | 239/276 X |

FOREIGN PATENT DOCUMENTS 2173714 10/1986 United Kingdom ............ 239/498

OTHER PUBLICATIONS

Cover page & pp. 5-9 from 1991 Rain Bird Sprinkler Mfg. Corp. catalog entitled "Agricultural Irrigation Equipment".

*Primary Examiner*—Andres Kashnikow
*Assistant Examiner*—Lesley D. Morris
*Attorney, Agent, or Firm*—Kelly Bauersfeld & Lowry

[57] ABSTRACT

A mini-sprinkler stake assembly including an elongated ground penetrating stake having an adapter for permitting easy and reliable mounting and replacement of mini-sprinkler units. A new and improved mini-sprinkler unit having a novel tree deflector is also disclosed, the mini-sprinkler unit having a separable nozzle element and dual pattern deflector element, one deflector surface of which includes a recessed for producing a generally V-shaped spray pattern for effectively and efficiently watering the root zone area of a tree.

44 Claims, 6 Drawing Sheets

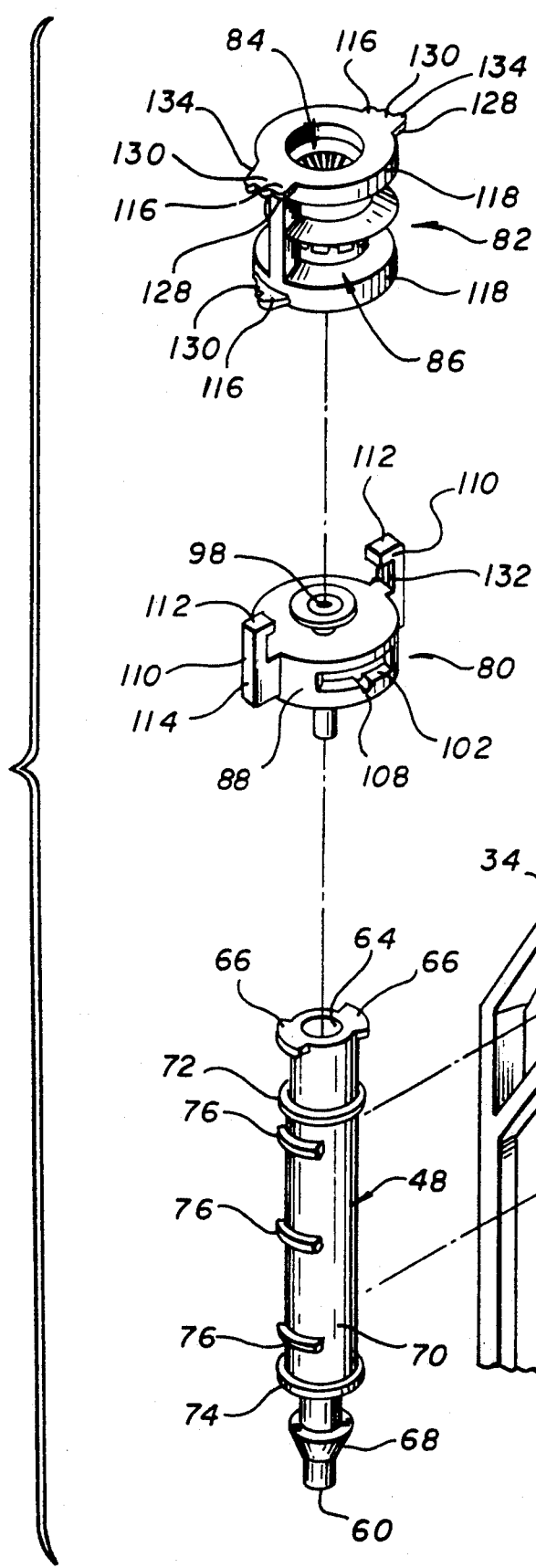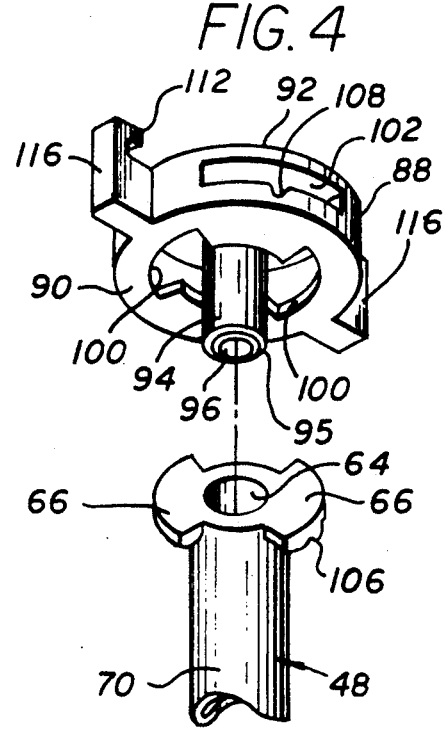
FIG. 4
FIG. 3

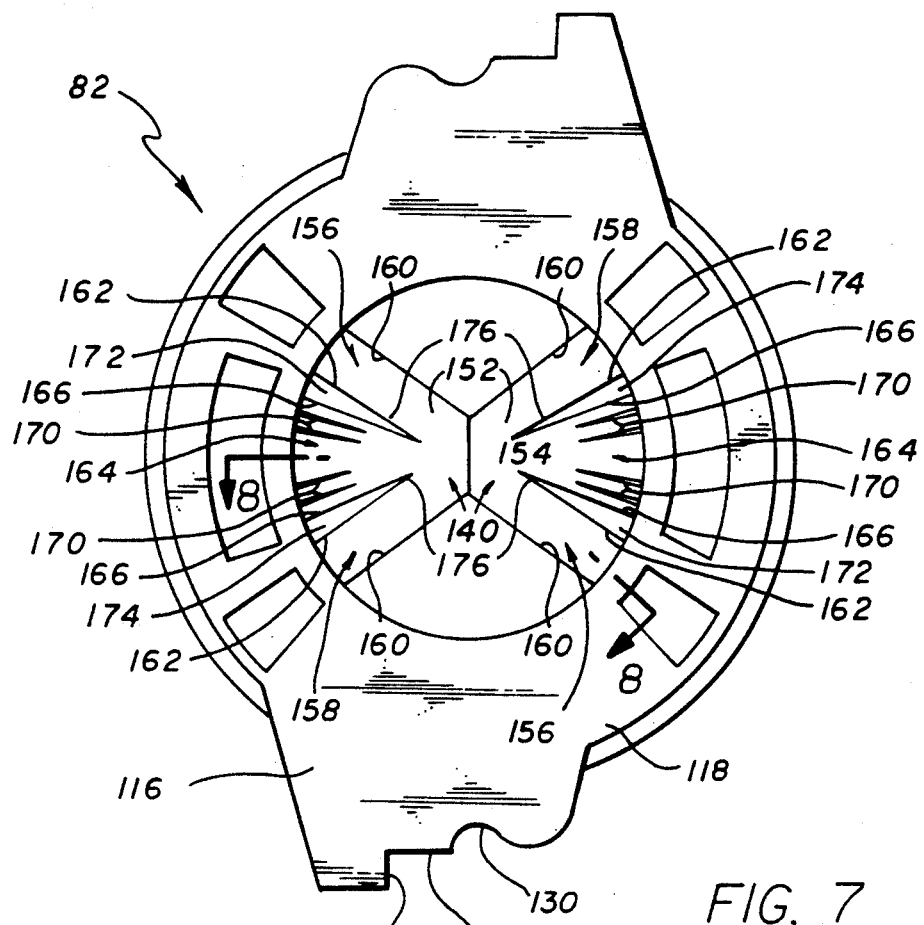
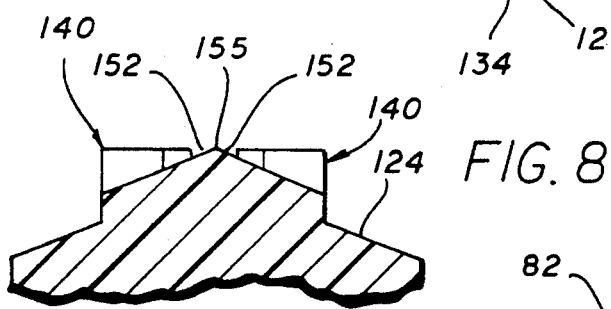
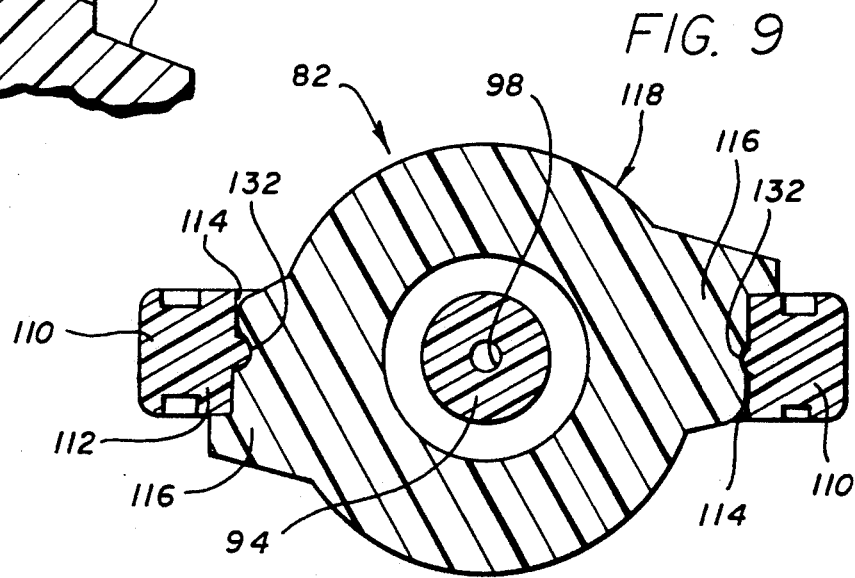

MINI-SPRINKLER STAKE ASSEMBLY AND MINI-SPRINKLER UNIT AND DEFLECTOR THEREFORE

BACKGROUND OF THE INVENTION

This invention relates generally to irrigation sprinklers, and more particularly to a new and improved low volume mini-sprinkler irrigation stake assembly, and to a new and improved dual pattern mini-sprinkler unit including a deflector specifically adapted for efficient irrigation of trees in an orchard.

Low volume mini-sprinkler systems have particular advantages over other types of sprinkler irrigation systems when used for watering plants and trees typically grown in orchards, vineyards, nurseries, greenhouses, and the like since they operate at relatively low supply pressures and flow rates, typically between 10 and 30 psi and between 5 and 30 GPH to save water, and produce spray patterns that are relatively close to the ground to minimize water loss due to wind drift. Further, such systems are relatively low in cost, energy efficient, easy to install and maintain, and can be readily changed, moved or modified to meet varying irrigation demands.

In a typical mini-sprinkler system installation such as used for irrigating plants and trees grown in side-by-side rows, main water supply conduits are laid along each row and coupled to a source of pressurized water. Mini-sprinkler units are then installed adjacent each plant, and the mini-sprinklers are each coupled with the main conduit, typically through small diameter, flexible branch tubes. Depending upon the type, age, and spacing between plants or trees, one mini-sprinkler unit may be used to water one or several adjacent plants or trees. Further, the type of plant or tree, its age and size, and the purpose of water application determine the type of mini-sprinkler unit to be used.

There are many different types of mini-sprinkler units available on the market, some intended to produce a spray pattern in the form of individual streams, and others which produce a fan-shaped spray. Some produce spray patterns that cover a substantially circular area about the sprinkler, and others produce spray patterns that cover only a segment of a circular area. A typical mini-spray unit comprises a nozzle which ejects a substantially vertical water stream into the atmosphere and a deflector overlying the nozzle which deflects the stream laterally of the sprinkler with the desired spray pattern. Exemplary of such mini-sprinkler units are those illustrated in the 1990 Rain Bird Agricultural Equipment catalogue at pages 5 through 8.

In most cases, each mini-sprinkler unit is intended to be coupled to the end of the branch tube and supported adjacent the plant or tree by a ground penetrating stake which typically includes means for directing and holding the branch tube so that the mini-sprinkler unit projects vertically above the stake. One such stake is that described in U.S. Pat. No. 4,944,476 issued Jul. 31, 1990, and another is illustrated in U.S. Design Pat. Des. No. 313,339 issued Jan. 1, 1991.

Since it is frequently desirable to be able to change mini-sprinkler units from time to time, such as to replace a worn deflector, clean out a plugged nozzle, or to alter the nozzle size or the spray pattern such as may be required as the plant matures or to apply fertilizer or other liquid plant treatment during selected irrigation periods, it is important that the mini-sprinkler unit be capable of being easily and quickly coupled to and uncoupled from the branch tube. Thus, most mini-sprinkler units include a coupling between the sprinkler and the branch tubing which can be released. In some cases, that coupling may be a simple barb or threaded portion on the mini-sprinkler unit which can be pushed or threaded into the end of the branch tubing directly, and in others, a twist-lock coupling is used, the twist-lock coupling typically comprising a coupler element having a barbed end inserted into the branch tubing and carrying coupling flanges which receive cooperating coupling ears formed on the mini-sprinkler unit.

One problem which has been found with prior art mini-sprinkler stake assemblies is that the barbed or threaded coupling of the mini-sprinkler unit to the branch tube may become loose during use, thereby permitting the mini-sprinkler unit to rotate relative to the stake and tube so that the spray pattern is no longer projected in the desired direction. Another problem is that the mini-sprinkler unit may actually "blow-out" and separate from the branch tube as a result of the barbed or threaded coupling becoming loose.

Moreover, since it is desirable to be able to change the spray pattern from time to time, care must be taken to insure that the different mini-sprinkler units all employ the same type of coupling. That is, if the mini-sprinkler unit in use has a twist-lock coupling with the branch tube, a new mini-sprinkler to be used must also have a twist-lock coupling. Thus, it would be desirable to have a universal mini-sprinkler stake assembly that could be used with mini-sprinkler units having substantially any type of coupling for connection with the branch tube. As will become more apparent hereinafter, the present invention provides a new and improved mini-sprinkler stake assembly which includes a universal coupling means for permitting substantially any mini-sprinkler unit to be quickly and easily coupled with the branch tubing, and which prevents sprinkler rotation and blow out.

Another problem which has been encountered is that typical prior art mini-sprinkler units do not lend themselves to alteration so that if a particular flow rate or spray pattern is desired, a user must obtain a mini-sprinkler unit having the desired flow rate and pattern. The present invention provides a new and improved mini-sprinkler unit which includes a separable nozzle element and dual pattern deflector so that the user can quickly and simply alter the flow rate by selecting the appropriate nozzle element and/or quickly and easily change the spray pattern by reversing the deflector element without having to replace the entire mini-sprinkler unit.

A further problem that has long plagued the irrigation field is that of effectively irrigating trees in an orchard such that the water is applied uniformly over only the root zone area around each tree, and does not spray on the tree trunks nor in the areas between trees where unwanted weeds or other plants may grow. As will also become more apparent hereinafter, the present invention provides a unique spray deflector configuration for a mini-sprinkler unit which insures uniform water application to the root zone areas around the trees of an orchard without applying water to the trunks of the trees or in the areas between trees.

SUMMARY OF THE INVENTION

The present invention provides a new and improved mini-sprinkler stake assembly which can be quickly and easily adapted for use in a wide variety of applications and which permits a wide range of different mini-sprinkler units to be used with out extensive modification and/or change of parts. Additionally, the present invention includes a new and unique multi-purpose mini-sprinkler unit particularly adapted to be used with the stake assembly of the invention, and which includes a novel spray deflector design which substantially improves watering efficiency and effectiveness when used for irrigating trees, particularly citrus, fruit, nut, and other trees typically grown in orchards.

The mini-sprinkler stake assembly of the invention includes an elongated support stake adapted to be embedded in the ground, and a tubular mounting adapter releasably coupled to the stake. The mounting adapter includes an inlet end to which a water supply tube can be connected, and an outlet end to which a mini-sprinkler unit can be releasably attached. The mounting adapter permits a wide variety of different mini-sprinkler units to be secured yet releasably supported by the stake, and includes means to prevent the adapter from moving relative to the stake during use. Since the mini-sprinkler unit is releasably yet securely coupled to the stake, preferably through a twist-lock type coupling, the mini-sprinkler can be easily and quickly removed for cleaning or replacement, even while the sprinkler system is in operation.

The mini-sprinkler unit of the invention is particularly well suited for use with the stake and adapter, and includes a separable nozzle element and dual pattern deflector element of unique design. Since the nozzle element and deflector element are releasably coupled together, different nozzle sizes can be used with the same deflector, or different deflectors can be used with a given nozzle, thereby increasing the variety of nozzle sizes and deflector patterns available. Moreover, the deflector element includes two separate deflector surfaces which can be selectively positioned over the nozzle for use so that the spray pattern can be quickly and simply altered by merely reversing the deflector element on the nozzle.

A further feature of the present invention is a novel deflection design which permits uniform watering of only the root zone area of the trees in an orchard. This is accomplished by a unique groove design formed in the deflector surface which produces a generally V-shaped spray pattern comprising two elongated generally V-shaped side sprays with a center, generally U-shaped spray extending therebetween. The combined side and center sprays produce a pattern which will effectively and efficiently apply a uniform amount of water over approximately one half of the root zone area of a tree. By employing two mini-sprinklers having such deflectors on opposite sides of a tree, the entire root zone area can be irrigated without substantial watering of the tree trunk or over-spray, which consequently reduces ground water contamination from any herbicides used leaching into the ground.

These and many other features and advantages of the present invention will become more apparent from the following detailed description when taken in conjunction with the accompanying drawings which illustrate, by way of example, the principles of the invention.

DESCRIPTION OF THE DRAWINGS

FIG. 3 is an enlarged fragmentary exploded perspective view of the mini-sprinkler and stake assembly components of FIG. 2;

FIG. 4 is a further enlarged fragmentary exploded perspective view illustrating the mounting of the mini-sprinkler nozzle unit to the adapter of the stake assembly;

FIG. 7 is an enlarged plan view of the mini-sprinkler unit showing the tree deflector groove pattern as viewed along the line 7—7 of FIG. 5;

FIG. 8 is an enlarged sectional view taken substantially along the line 8—8 of FIG. 7;

FIG. 9 is an enlarged sectional view taken substantially along the line 9—9 of FIG. 1;

DETAILED DESCRIPTION OF PRESENTLY PREFERRED EMBODIMENT

Figure 1:
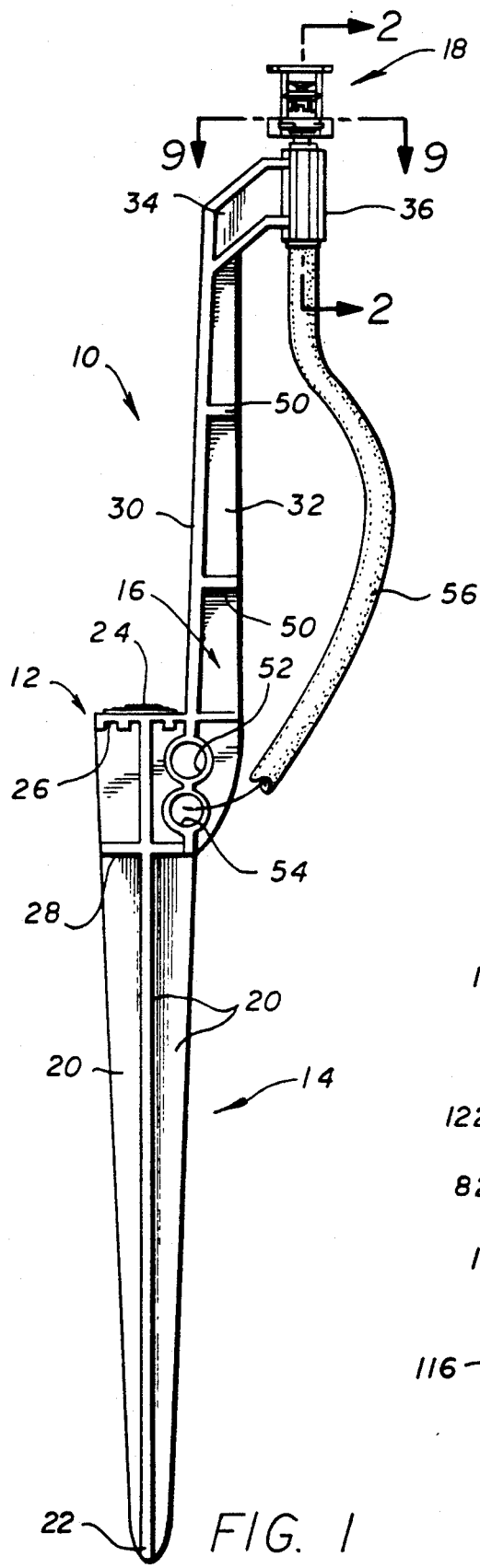
FIG. 1 is a side elevational view of a stake assembly in accordance with the present invention, and illustrating in fragmentary perspective a water supply tube coupled to a mini-sprinkler unit of the invention.
Figure 5:
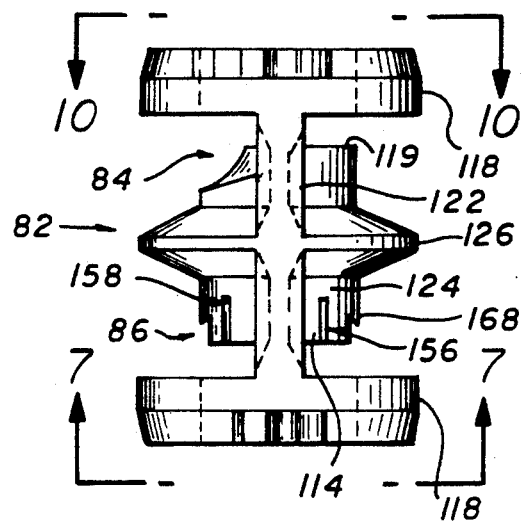
FIG. 5 is an enlarged side elevational view of a mini-sprinkler unit employing a novel tree deflector surface of the invention.
Figure 6:
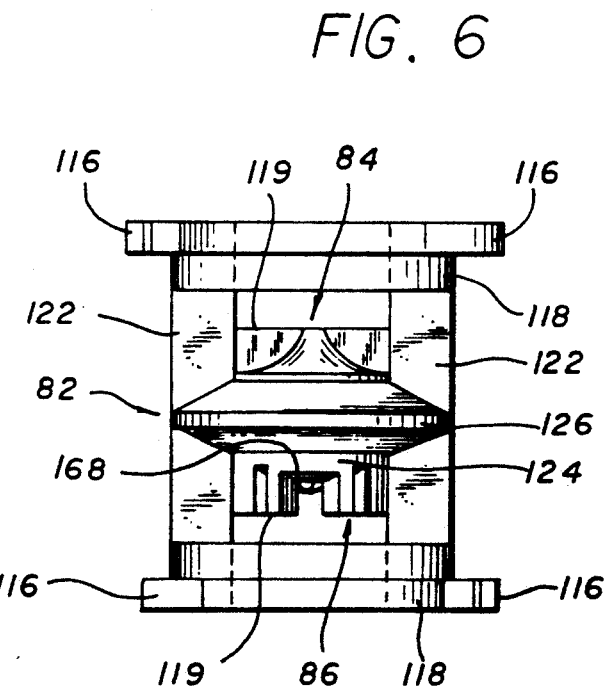
FIG. 6 is a side elevational view similar to FIG. 5 showing the mini-sprinkler unit rotated 90 degrees from the position shown in FIG. 5.

As shown in the exemplary drawings, the present invention is embodied in a new and improved mini-sprinkler stake assembly 10 primarily intended to be used for the irrigating of plants and trees such as typically grown in orchards, vineyards, nurseries, greenhouses, etc. In this instance, as best seen in FIG. 1, the stake assembly 10 includes a support stake 12, preferably formed from molded plastic such as UV-resistant polypropylene, having a lower, elongated ground penetrating portion 14, and an upper, laterally off-set riser portion 16 supporting a new and improved mini-sprinkler unit 18 from which water is sprayed on adjacent plants and trees. The ground penetrating portion 14 herein is formed by four downwardly tapering symmetrical webs 20 (only three of which can be seen in FIG. 1) disposed at right angles to each other, and defining a lower pointed end 22 and an upper end formed by a generally flat shoulder or pad 24 axially aligned with the pointed end, and which is used as a surface for forcing the pointed end into the ground. Circular shaped reinforcing ribs 26 and 28 are disposed, respectively, below the pad 24 and at a longitudinally downwardly spaced location along the webs 20 to provide increased structural rigidity to the ground penetrating portion 14. With this arrangement, the stake 12 can be supported in the ground by striking the pad 24 with a hammer or the like, or by applying a downward force such as by stepping on the pad to push the pointed end 22 into the ground so that the webs 20 are fully imbedded in the soil with the riser portion 16 projecting there above.

As best seen in FIG. 1, the riser portion 16 is formed to project upwardly above the pad 24 from one side of the ground penetrating portion 14, and herein has a generally T-shaped horizontal cross section formed by a generally flat sided arm 30 with an integrally formed longitudinal reinforcing web 32 extending outwardly along one side, and terminates upwardly in a laterally directed support arm portion 34 carrying a longitudinally directed channel member 36 having a generally C-shaped horizontal cross section. As can best be seen in FIG. 3, the channel member 36 forms a generally cylindrical receptacle 38 extending between upper and lower ends 40 and 42, respectively, and is formed with a longitudinal side opening 44 defined between arcuately spaced opposed side edges 46. As will be explained in more detail hereinafter, the channel member 36 is provided for supporting a mounting adapter 48 to which the mini-sprinkler unit 18 can be removably attached. Herein, suitable reinforcing ribs 50 are also molded at spaced locations between the arm 30 and the reinforcing web 32 to provide structural rigidity to the riser portion 16.

Adjacent the junction of the body portion 14 and the riser portion 16, the stake 12 is herein provided with a pair of laterally directed cylindrical conduits 52 and 54 of different diameters through which a flexible water supply branch tube 56 can be directed and supported for coupling the mini-sprinkler unit 18 with a source of pressurized water (not shown). Preferably, the conduits 52 and 54 are dimensioned to receive irrigation water branch tubes 56 of conventional diameters, typically tubes having a nominal inside diameter of 0.150 inches with varying wall thicknesses to an outside diameter of about 0.350 inches.

In accordance with an important aspect of the present invention, the adapter 48 of the stake assembly 10 provides a simple, effective and reliable means for quickly and easily changing mini-sprinkler units 18 while insuring that the mini-sprinkler unit is securely attached so that it can not become loose even after prolonged use, and thus will insure that the mini-sprinkler unit will always disburse its spray pattern in the intended direction. Moreover, the adapter 48 permits a wide variety of types of mini-sprinkler units 18 from a variety of different manufacturers and suppliers to be used with the stake assembly 10 so that the user can freely select substantially any particular mini-sprinkler unit without concern for the type of coupling employed by the mini-sprinkler unit for attachment to the branch tube 56.

Figure 2:
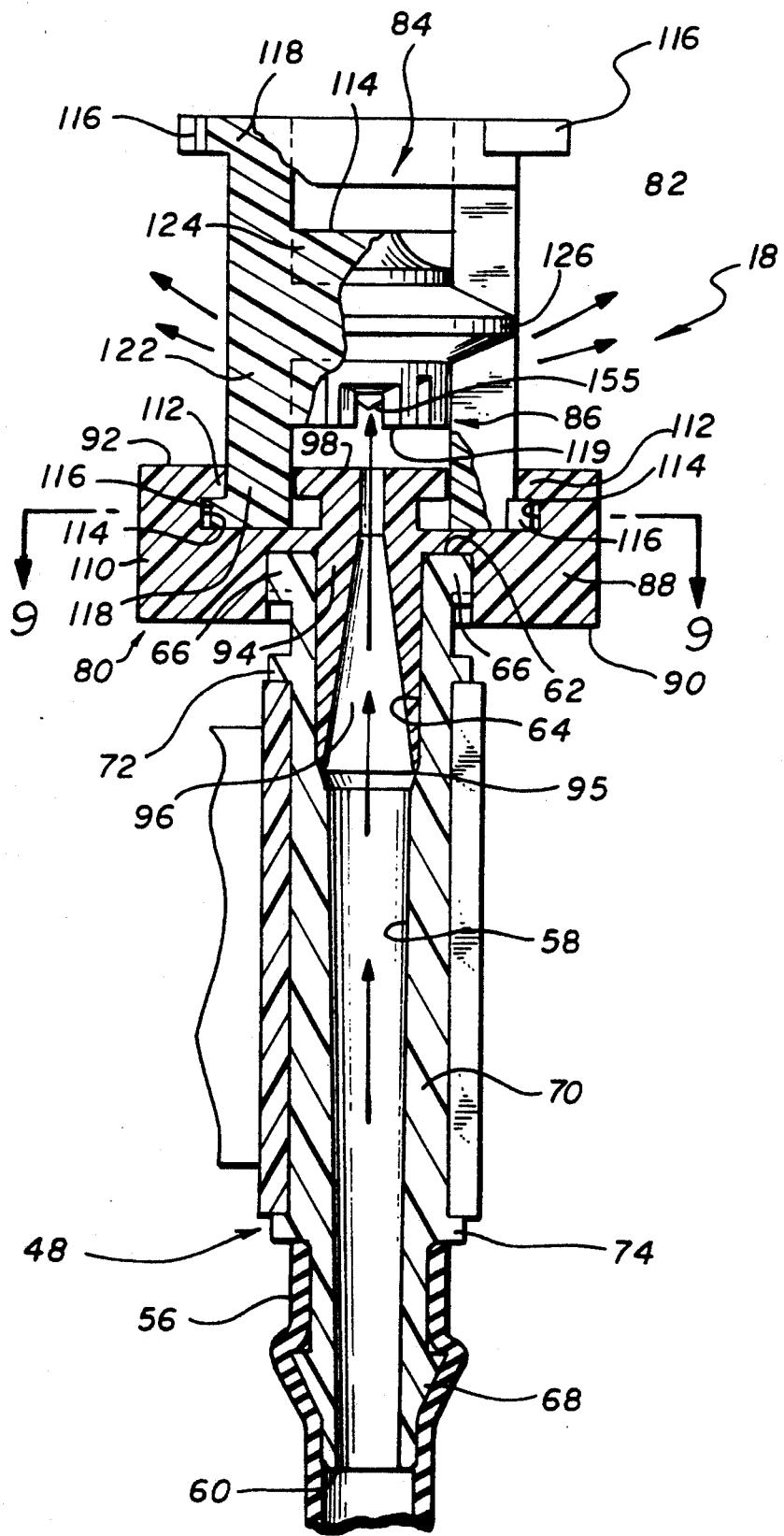
FIG. 2 is an enlarged fragmentary side elevational view, partly in cut away cross-section of the mini-sprinkler and stake assembly as viewed along the line 2—2 of FIG. 1.
Figure 10:
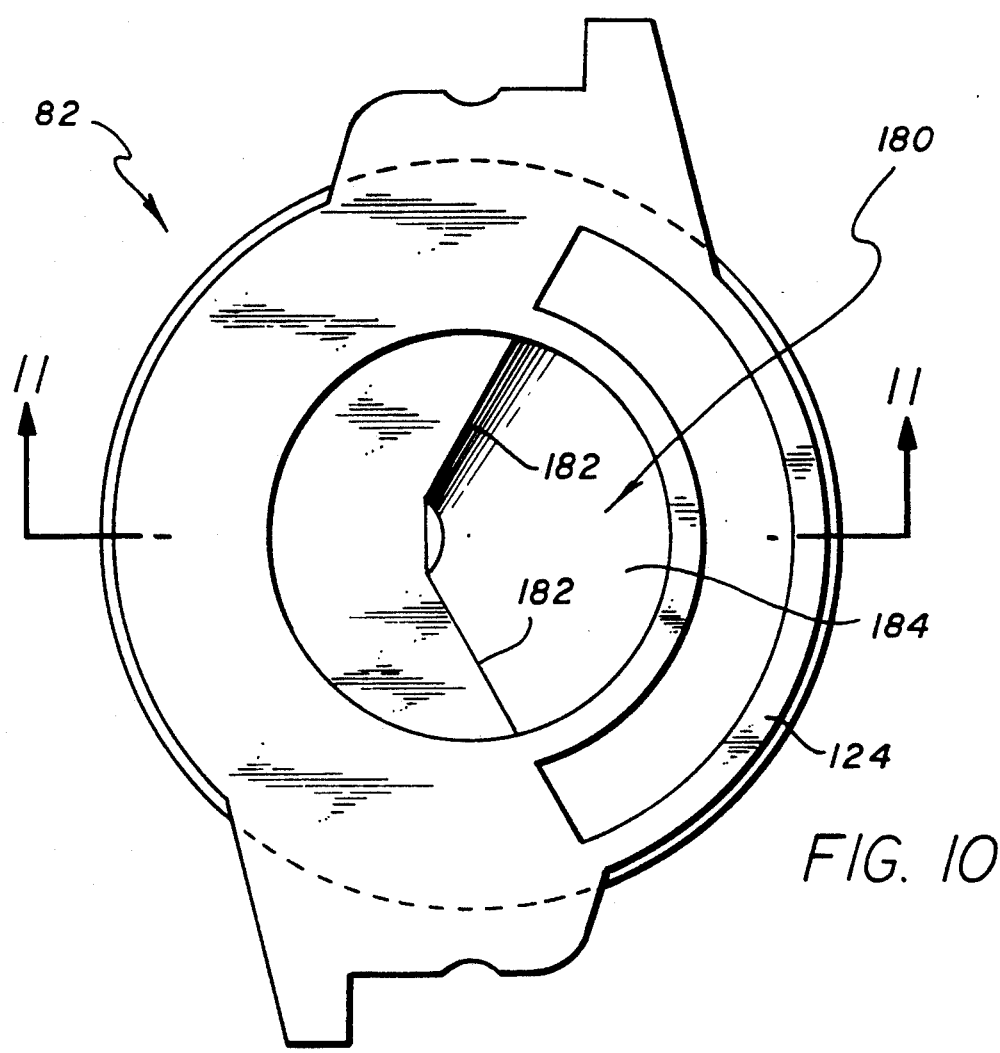
FIG. 10 is an enlarged top plan view of the mini-sprinkler unit as viewed along the line 10—10 of FIG. 5.
Figure 11:
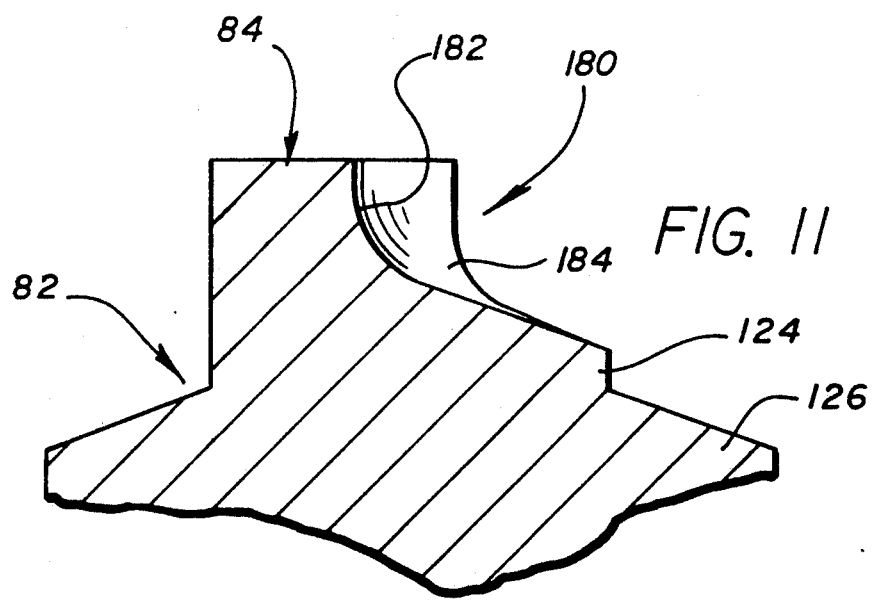
FIG. 11 is a sectional view taken substantially along the line 11—11 of FIG. 10.

Toward the foregoing ends and as best seen in FIGS. 2 and 3, the adapter 48, which preferably is also formed from molded polypropylene, is generally tubular in shape with a water passageway 58 extending longitudinally therethrough between a lower end 60 and an upper end 62, an upper portion 64 of the passageway having an enlarged diameter. Extending radially outwardly from the upper end 62 of the adapter 48 are a pair of diametrically opposed coupling ears 66 which form one means for releasably attaching the mini-sprinkler unit 18 to the adapter, as will be more fully discussed hereinbelow. Formed about the lower end portion 60 of the adapter 48 is a coupling barb 68 of conventional design which can be friction fit into the end of the water branch tube 56 to couple the tube to the adapter. Disposed between the upper and lower ends 62 and 60 of the adapter 48 is a cylindrical body portion 70 having an outside diameter substantially equal to the diameter of the receptacle 38 of the channel member 36, and which is provided with two peripheral flanges 72 and 74 longitudinally spaced apart a distance substantially equal to the length of the channel member. Disposed on one side of the body portion 70 are a plurality, herein three, of alignment ribs 76 which project outwardly from the periphery and extend circumferentially a distance equal to the gap between the opposed side edges 46 of the opening 44 in the channel member 36. With this arrangement, the adapter 48 can be snap fit into the receptacle 38 of the channel member 36 by aligning the flanges 72 and 74 with the upper and lower ends 62 and 60 of the channel member, and then snapping the body portion 70 through the opening 44 with the alignment ribs 76 bridging the gap between the side edges 46. Provision of the alignment ribs 76 insures that the adapter 48 can only be snap fit into the channel member 36 in one position, and when snap fit into place, the alignment ribs prevent the adapter from rotating relative to the channel member since the ends of the ribs abut the side edges 46 of the channel member.

It is important to note that the passageway 58 through the adapter 48 has an enlarged internal diameter portion 64 extending downwardly from the upper end 62. The diameter of this enlarged portion 64 is formed to permit the threaded end of a conventional mini-sprinkler unit 18, such as those offered for sale by Rain Bird Sprinkler Mfg. Corp. of Glendora, Calif. as depicted, for example at pages 5 through 8 of its 1990 Agricultural Equipment Catalogue, to be threaded into the adapter 48. Typically, such mini-sprinkler units are made from a relatively hard acetal plastic material such a Delrin, and although the enlarged diameter portion 64 of the adapter 48 can be formed with mating threads for receiving mini-sprinkler units, it has been found that the relatively soft polypropylene material of the adapter will permit such a mini-sprinkler units to be threaded into the adapter without providing separate threads since the relatively hard Delrin material will be self tapping and deform the wall of the passageway 64, thereby to securely hold the mini-sprinkler unit in place such that it will not become loose even after prolonged use.

In accordance with a presently preferred embodiment of the invention, the adapter 48 is particularly suitable for use with mini-sprinkler units 18 which employ a twist-lock, quick connect type coupling for use with the branch tube 56. In this instance, the mini-sprinkler unit 18 of the present invention employs such a twist-lock coupling, and comprises two separable components including a nozzle element 80 and a dual pattern, reversible deflector element 82 having a pair of oppositely facing deflectors, generally designated 84 and 86 in FIGS. 2 and 3, which can be selectively oriented for use with the nozzle element. Provision of separable nozzle elements 80 and deflector elements 82 permits a user to independently select and change flow rates for use with any given deflector, and select and change the deflector pattern for use with any selected nozzle.

As best seen in FIGS. 2, 3 and 4, the nozzle element 80, which preferably is formed of molded plastic, includes a generally cylindrical nozzle body 88 having upper and lower ends 90 and 92, respectively, and supports an elongated tubular nozzle conduit 94 having a converging central water passage 96 therethrough. The lower portion of the nozzle conduit 94 is dimensioned to be received in the enlarged diameter portion 64 of the passageway 58 through the adapter 48, and serves to direct water from the adapter through the converging nozzle passage 96 to a nozzle outlet orifice 98 from which water is discharged as a pressurized stream. Preferably, the nozzle conduit 94 has a thin walled tapered end 95 that deforms when engaged with the lower end of the bore 64 in the adaptor 48, and thus forms a pressure activated lip seal to prevent leakage between the nozzle 80 and adaptor.

To releasably attach the nozzle element 80 to the adapter 48, a twist-lock coupling is herein formed in the nozzle body by a pair of recessed axially directed openings 100 (see FIG. 4) formed through the lower end face 92 of the nozzle body 88, and which are dimensioned to receive the coupling ears 66 of the adapter. Arcuate radially opening slots 102 are formed through the side of the nozzle body 88 at diametrically opposed locations spaced approximately 90 degrees from the adjacent recessed openings 100 and which can receive the coupling ears 66 by inserting the ears into the openings 100 and twisting the nozzle body 88 about its longitudinal axis to move the slots 102 into alignment with the ears. In this instance, axially downwardly directed projections 106 are formed on the coupling ears 66 which mate with corresponding grooves 108 formed in the slots 102 to orient and hold the nozzle body 88 in the assembled condition on the adapter 48. When the nozzle element 80 has been assembled on the adapter 48 and the adapter is coupled to the channel member 36, water admitted into the water passageway 58 from the branch tube 56 will flow through the nozzle passage 96 and be ejected in a substantially vertical direction from the nozzle orifice 98 into the atmosphere as a pressurized water stream.

The twist-lock coupling of the nozzle element 80 to the adapter 48 permits easy and rapid replacement of nozzle elements such as may be required from time to time for repair or replacement when larger or smaller quantities of water are desired. Provision of the twist-lock coupling allows the nozzle element 80 to be removed from and replaced on the adapter 48 even while pressurized water is being supplied so that no interruption in the system irrigation cycle need by initiated before nozzle element removal.

To intercept the stream of water ejected from the nozzle orifice 98 and redirect and distribute the water laterally of the stake assembly 10, the dual pattern deflector element 82 of the novel mini-sprinkler 18 is attached to the upper end 92 of the nozzle unit 88 in line with the nozzle orifice 98. In this instance, the deflector element 82 is removably attached to the nozzle body 88, herein by a twist lock attachment including locking projections 110 formed by axially projecting ears extending upwardly from diametrically opposed sides of the nozzle body 88 and having radially inwardly extending upper ends 112 which define locking channels 114, and which receive one of two identical pairs of cooperating coupling tabs 116 which project radially from the deflector element. Provisions of the twist lock attachment between the deflector element 82 and the nozzle unit 88 allows the deflector to be quickly and easily changed, even while the unit is in use.

As can best be seen in FIGS. 2, 3, 5 and 6, the dual pattern deflector element 82, which preferably is molded as an integral unit, comprises a pair of axially spaced doughnut shaped rings 118 interconnected by a pair of axially extending struts 122 disposed on diametrically opposite sides of the rings. Supported by the struts 122 intermediate the rings 118 is a cylindrical deflector body 124 in which is formed the oppositely facing deflectors 84 and 86, the body herein having a radially enlarged central section 126 integrally molded with the struts to position the body centrally between the rings 118 and generally horizontal end faces 119 in which the deflectors are formed. As best seen in FIGS. 7 and 9, each pair of coupling tabs 116 are formed to project outwardly in a radial direction from opposite sides of each of the rings 118, and are each formed with a radially outer surface 128 having a notch 130 adapted to receive a longitudinal detent rib 132 formed centrally along the inside of the locking channels 114 of the locking projections 110, and a radial stop shoulder 134 adapted to abut the side of the locking projections.

With this construction, the deflector element 82 can be removably locked to the nozzle element 80 by aligning one or the other of the coupling tab pairs 116 with the locking channels 114 of the locking projections 110, and twisting the deflector element to move the tabs into the locking channels with the detent notches 130 receiving the detent ribs 132 and the stop shoulders 134 abutting the sides of the locking channels, as shown in FIG. 9. When locked in place on the nozzle element 80, one or the other of the deflectors 84 and 86 will face the nozzle orifice 98 and act to deflect the stream of water issuing therefrom laterally outwardly of the stake assembly 10.

In accordance with a further and important aspect of the present invention, one of the two deflectors, herein the deflector designated by reference numeral 86 and hereinafter referred to as the "tree deflector", is uniquely formed to produce a spray pattern of novel shape and distribution for particular use in the irrigation of trees in an orchard. It is well known that when irrigating trees in an orchard, water should be applied to the area around the tree yet not be applied on the tree trunk since this may damage the tree, and that to conserve water and retard the growth of unwanted weeds and other plants, the water should not be applied to the spaces between trees. Thus, the most efficient application of water for the irrigation of trees is to apply the water over a ring shaped root zone area below the tree which is defined by the area bounded by a circle whose diameter is substantially equal to the diameter of the tree canopy and a circle whose diameter is approximately three to five feet inwardly therefrom toward the tree trunk, depending on the size of the tree.

In a typical mature tree orchard such as a citrus orchard, trees are spaced in side by side rows approximately 18 feet apart, and each row is spaced approximately 20 feet apart. Each tree will have a canopy with a diameter of approximately 16 feet around the tree trunk centerline, and the root zone area to be watered will be a ring shaped area having a maximum diameter of approximately 16 feet and a minimum diameter of between 10 and 6 feet. The novel tree deflector 86 of the invention is particularly formed and configured for achieving efficient and reliable irrigation of only the desired root zone area around each individual tree in an orchard by producing a novel spray pattern having a substantially uniform rate of water application over the area covered so that through the use of two mini-sprinkler units employing the novel tree deflector 86, the entire root zone area can be uniformly watered without wetting the tree trunk or spraying the area between trees.

Toward the foregoing ends, as shown in FIGS. 7 and 8, the tree deflector 86 herein is formed by a grooved pattern defined by two sets of identically shaped recessed channels, generally designated 140, formed into the horizontal end face 119, and which channel the intercepted water stream from the nozzle element 80 into a generally V-shaped pattern and redirect the channeled water laterally outwardly away from the mini-sprinkler unit 18 as a generally V-shaped water spray. As shown, each of the channels 140 extend outwardly in generally radial directions from adjacent the center of the deflector 86 to the outer periphery of the deflector body 124, and each set of channels 140 herein is formed to be the mirror image of the other about a diametrical plane of symmetry extending longitudinally through the struts 122 so that substantially identical oppositely directed spray patterns can be projected laterally from opposed sides of the deflector body 124 between the struts.

Figure 12:
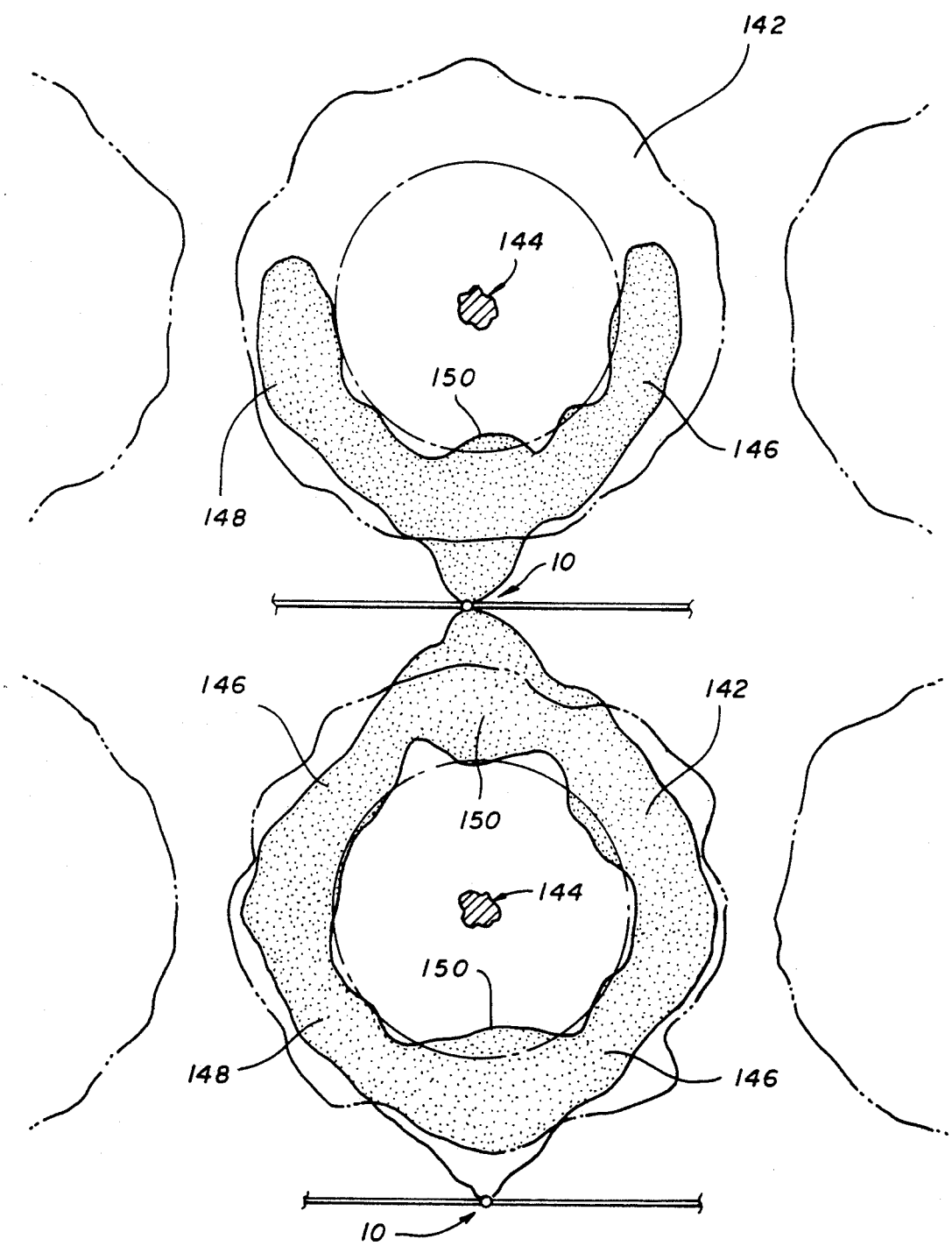
FIG. 12 is a schematic plan view illustrating the approximate area of coverage of water from a mini-sprinkler unit having the novel tree deflector of the invention in relation to the root zone area of trees in an orchard.

As schematically illustrated in FIG. 12, each set of deflector channels 140 is formed to produce a spray pattern over the ground which extends laterally from the stake assembly 10 outwardly toward the root zone area, designated 142, of an adjacent tree, the trunk of which is generally designated 144, and which has an overall generally V-shaped appearance from each side of the stake assembly 10. This spray pattern as achieved by forming each set of channels 140 to produce two relatively elongated tear-drop shaped side spray portions 146 and 148 laterally spaced by a shorter, relatively wide generally U-shaped central spray portion 150, the two tear-drop shaped portions diverging outwardly from the stake assembly 10 to a location approximately adjacent to the side of the tree trunk 144, and the central U-shaped portion extending between the tear-drop shaped side portions outwardly from the stake assembly toward the tree but terminating before reaching its trunk. By controlling the shape of the deflector channels 140 of the tree deflector 86, the tear-drop shaped side spray portions 146 and 148 and the U-shaped central spray portion 150 can be caused to disburse the water over approximately one half of the root zone area 142, and to produce a substantially uniform water application rate over the area sprayed. By employing two mini-sprinkler units 18 on opposite sides of a tree, the entire root zone area 142 can be effectively and efficiently watered, as shown in FIG. 12.

Again referring primarily to FIGS. 7 and 8, the channels 140 are each formed to have oppositely directed inclined bottom walls 152 which extend more deeply into the deflector body 124 from an apex 154 lying in the plane of symmetry at the center of the deflector 86, this apex serving to equally divide the water stream ejected from the outlet orifice 98 of the nozzle element 80 and re-direct the divided water toward each of the sets of deflector channels 140 on either side. To produce the tear-drop shaped side spray portions 146 and 148, each set of deflector channels 140 includes two side grooves 156 and 158 deeply recessed into the deflector body 124 and each defined by spaced vertical side walls 160 and 162 which herein extend parallel to each other in a generally radially outward direction, and a sloping, generally flat bottom wall which is herein is formed as an extension of the inclined bottom wall 152. The side walls 160 and 162 together with the bottom wall 152 each extend to the outer periphery of the deflector body 124 so as to form slit-like outlet openings of generally elongated rectangular cross section (see FIGS. 5 and 6) arrayed in a generally V-shaped pattern extending from opposite sides of the apex 154.

To form the central U-shaped spray portion 150, each set of deflector channels 140 includes a middle generally fan-shaped groove 164 also deeply recessed into the deflector body 124, and herein defined by a bottom wall formed as an extension of the inclined bottom wall 152, and extending between a pair of spaced side walls 166 which diverge relative to each other in a generally radially outwardly direction to the periphery of the deflector body 124. The bottom wall of the middle groove 164 herein is formed with a terminal portion 168 which has a slightly convex shape (see FIGS. 5 and 6) between the side walls 166. By forming the bottom wall of the middle groove 164 in this manner, the central U-shaped spray portion 150 issuing from the middle groove will have lateral side spray portions which extend slightly further from the stake assembly 10 than the center spray portion so that the terminal end of the spray pattern will more closely approximate the curvature of the inner portion of the ring shaped area of the root zone area 142 between the tear-drop shaped side spray portions 146 and 148. To assist in directing the water smoothly through the middle groove 164, raised elongated ribs 170 are preferably formed along the bottom wall and which serve to straighten the flow as the water diverges during movement through the middle groove.

As thus formed, the side grooves 156 and 158 are separated from the middle groove 164 by two generally wedge shaped posts 172 and 174 having radially inner dividing apices 176 each formed by the junctions of the side wall 162 of the side grooves and the side wall 166 of the middle groove. It will be noted that the opening to the middle grooves 164 between the apices 176 of the posts 172 and 174 is smaller than the openings to the side grooves 156 and 158 formed between the apices and the opposed side walls 160 so that a greater volume of water can be directed to the side grooves than to the middle groove. By controlling the volume of water directed to the side grooves 156 and 158 versus that directed to the middle groove 164, the application rate of water from the side grooves per unit area of coverage can be controlled to be substantially the same as that of the application rate per unit area produced by the middle groove, thereby producing a uniform rate of water application over the entire area sprayed with the tree deflector 86.

In one presently preferred embodiment, the bottom inclined wall 152 of the channels 140 is inclined from the apex 154 at a 20 degree angle with respect to the horizontal so that water ejected from the side grooves will be sprayed laterally and upwardly relative to the stake assembly 10 at a 20 degree angle. The bottom wall of the middle groove 164 is formed so that the center of the convex terminal portion 168 forms a 15 degree angle with respect to the horizontal so that water ejected from the middle groove will be sprayed laterally and upwardly relative to the stake assembly 10 at angles varying uniformly from 15 degrees at the center to 20 degrees on the sides. This configuration has been found to produce tear-drop shaped side spray portions 146 and 148 which extend laterally outwardly from the stake assembly approximately 10 to 14 feet, and a central spray portion 150 which extends between the side spray portions in a generally U-shaped pattern with its center approximately 5 to 6 feet outwardly from the stake assembly.

To achieve a substantially uniform rate of water application over the entire area sprayed, is has been found that each of the side grooves 156 and 158 should be dimensioned to receive approximately 21 percent of the water from the nozzle outlet 98, and that each of the middle grooves 164 should receive approximately 8 percent. With this distribution, it was found that for a stake assembly 10 positioned ten feet from the trunk of a tree 144, and mounted with the deflector unit 82 approximately eight inches above the ground, when water under 20 pounds per square inch pressure was supplied to the mini-sprinkler 18 employing a nozzle element 80 having a flow rate of approximately seventeen gallons per hour, the side sprays 146 and 148 were found to cover an area like that generally depicted in FIG. 12 with a relatively uniform application rate of approximately 18 cubic centimeters per square foot, while the center U-shaped spray similarly covered an area like that generally depicted and produced approximately 18 cubic centimeters per square foot over the area covered.

It should be noted that the distribution of water over the side spray areas 146 and 148 may be improved by forming small "bumps" or projections within the side grooves 156 and 158 to break up the streams and improve close-in watering. The bumps or projections preferably can be formed as raised ribs within the grooves 156 and 158, either formed to project from the bottom walls or to project inwardly from one or both of the sidewalls 160, 162.

It is important to note that the deflector element 82 can be formed to have the same or a different spray pattern producing deflector surface formed in each of the opposed faces. In some instances, it may be desirable to form two tree deflector surfaces 86 such as the tree deflector surface 86 so that if one becomes worn or broken during use, the deflector unit need only be reversed and turned upside down to position a new tree deflector surface to intercept the water from the nozzle element 80. Preferably, however, the deflector unit 82 will be formed with one tree deflector surface 86 and a different spray pattern producing deflector surface 84 of conventional design which can be used for a different purpose, as desired. Further, the deflector 82 can be made so that the deflector surfaces 84 and 86 spray from only one side, such as surface 84 or from both sides such as illustrated for the tree deflector 86 in FIG. 7.

As illustrated in the exemplary drawings of FIGS. 5, 6, 10 and 11, the deflector surface 84 opposite the tree deflector 86 herein is formed to have a generally conventional grooved pattern in the horizontal end face 119 for producing a generally uniform, part circle spray pattern of approximately 120 degrees. Such a spray pattern has particular utility when the mini-sprinkler unit 18 is used to initially irrigate very young trees before the root zone area has become fully defined. In this instance, the part circle spray pattern of the deflector surface 84 is illustrated as being formed on only one side of the deflector body 124 by a single arcuate groove 180 formed in the body, and which includes diverging sidewalls 182 and a sloping bottom wall 184 formed so that when the deflector surface 84 is positioned to intercept the stream from the nozzle element 80, the groove will deflect the water upwardly and laterally away from the mini-sprinkler unit 18 as a single generally fan-shaped spray covering an area of approximately 120 degrees about the sprinkler. Deflector surfaces such as formed by the groove 180 have long been used with mini-sprinkler units for producing part circle spray patterns, and it should be apparent that a similar shaped part circle pattern could also be formed in the deflector surface 84 to produce a similar spray pattern from the laterally opposite side of the mini-sprinkler. In this regard, it should also be noted that the tree deflector surface 86 can also be formed as one of a pair of deflector surfaces where the opposed deflector surface 84 takes other shapes, such as a radially grooved surface which forms a substantially full circle spray pattern, the particular shape of a deflector surface 84 other than the tree deflector 86 forming no part of this invention.

From the foregoing, it should be apparent that the present invention provides a highly effective and versatile mini-sprinkler stake assembly 10 which can be quickly and easily adapted for use in a wide variety of applications and with a wide variety of mini-sprinkler units. With the stake assembly 10 and its adapter 48, the mini-sprinkler unit 18 can be quickly and easily changed or removed for cleaning without requiring that the water supply be shut off, and the adapter insures that a secure and stable replacement of the mini-sprinkler unit will result. The novel mini-sprinkler unit 18 with its separable nozzle element 80 and dual pattern deflector 82 permits a wide variety of flow rates and/or spray patterns to be selected and used with a single stake assembly 10. Moreover, the mini-sprinkler stake assembly 10 is particularly suitable for use with a mini-sprinkler unit 18 employing the novel tree deflector 86 for irrigating trees in an orchard in a highly effective and efficient manner. The novel tree deflector 86 insures that only the root zone area around a tree is watered so as to prevent water damage to the tree and retard the growth of weeds and the like, and thus eliminates or greatly minimizes leaching of any herbicides used into the ground water table, which makes this system very environmentally friendly. Further the novel tree deflector 86 provides a substantially uniform rate of water application throughout the root zone area to promote efficient water use with low water loss.

While the present invention has been illustrated and described in connection with the presently preferred embodiment, it will be readily apparent to those skilled in the art that various changes and modifications can be made without departing from the spirit and scope of the invention as defined by the appended claims.

We claim:

1. A mini-sprinkler irrigation stake assembly for use in spraying water over the ground from a supply tube coupled with a source of pressurized water, said stake assembly comprising:

an elongated support stake having a ground penetrating portion adapted to be embedded in the ground and a mini-sprinkler support portion adapted to project above the ground, said support portion including a generally C-shaped elongated support channel;

a tubular mounting adapter dimensioned to be releasably received and retained in said C-shaped channel and including an inlet end portion adapted to be coupled with said supply tube and an outlet end portion projecting above said C-shaped channel;

a mini-sprinkler unit for receiving pressurized water and ejecting said water outwardly away from said unit as a water spray of predetermined shape; and means for releasably coupling said mini-sprinkler unit to said outlet end portion of said adapter whereby water received by said adapter from said supply tube is communicated to said mini-sprinkler unit and ejected thereby over the ground with said predetermined shape.

2. A stake assembly as set forth in claim 1 wherein said means for releasably coupling comprises a twist-lock coupling formed by cooperating means on said outlet end portion of said adapter and on said mini-sprinkler unit.

3. A stake assembly as set forth in claim 2 wherein said cooperating means comprises coupling ears formed on said adapter and recessed openings formed on said mini-sprinkler unit, said recessed openings being dimensioned to releasably receive and retain said coupling ears.

4. A stake assembly as set forth in claim 1 wherein said adapter is formed of relatively soft polypropylene plastic material and said mini-sprinkler unit is formed of a relatively hard plastic material.

5. A stake assembly as set forth in claim 4 wherein said relatively hard plastic material is Acetal.

6. A stake assembly as set forth in claim 1 wherein said adapter is dimensioned to be snap-fit into said support channel, and includes alignment means for preventing movement of said adapter relative to said support channel when supported therein.

7. A stake assembly as set forth in claim 6 wherein said means for releasably coupling comprises a twist-lock coupling formed by cooperating means on said outlet end portion of said adapter and on said mini-sprinkler unit.

8. A stake assembly as set forth in claim 7 wherein said cooperating means comprises coupling ears formed on said adapter and recessed openings formed on said mini-sprinkler unit, said recessed openings being dimensioned to releasably receive and retain said coupling ears.

9. A stake assembly as set forth in claim 8 wherein said mini-sprinkler unit includes a nozzle element releasably coupled to a deflector element, said nozzle element including an outlet opening for ejecting a water stream in a generally vertical direction, and said deflector element being disposed to overlie said nozzle outlet and intercept said stream, said deflector element acting to redirect said stream laterally of said stake as a water spray of predetermined shape.

10. A stake assembly as set forth in claim 9 wherein said predetermined shape is a generally V-shaped spray pattern.

11. A stake assembly as set forth in claim 10 wherein said V-shaped spray pattern is formed by a pair of laterally diverging elongated generally tear-drop shaped side spray portions laterally spaced by a center generally U-shaped spray portion.

12. A stake assembly as set forth in claim 11 wherein said deflector element includes a pair of oppositely directed deflector surfaces, said deflector element being reversable with respect to said nozzle outlet to position one or the other of said opposed deflector surfaces in a position to intercept said stream.

13. A stake assembly as set forth in claim 12 wherein each of said deflector surfaces is formed by grooves recessed into said deflector surface and which act to redirect the stream from said nozzle outlet into a laterally directed spray having said predetermined shape.

14. A stake assembly as set forth in claim 1 wherein said mini-sprinkler unit includes a nozzle element releasably coupled to a deflector element, said nozzle element including an outlet opening for ejecting a water stream in a generally vertical direction, and said deflector element being disposed to overlie said nozzle outlet and intercept said stream, said deflector element acting to redirect said stream laterally of said stake as a water spray of predetermined shape.

15. A stake assembly as set forth in claim 14 wherein said predetermined shape is a generally V-shaped spray pattern.

16. A stake assembly as set forth in claim 15 wherein said V-shaped spray pattern is formed as a pair of laterally diverging elongated generally tear-drop shaped side spray portions laterally spaced by a center generally U-shaped spray portion.

17. A stake assembly as set forth in claim 16 wherein said deflector element includes a generally horizontally disposed deflector surface having grooves formed therein, said grooves acting to divide and redirect the water stream from said nozzle outlet into said laterally directed spray.

18. A stake assembly as set forth in claim 14 wherein said deflector element includes a pair of oppositely directed deflector surfaces, said deflector element being reversable with respect to said nozzle outlet to position one or the other of said opposed deflector surfaces in a position to intercept said stream.

19. A stake assembly as set forth in claim 18 wherein each of said deflector surfaces is formed with grooves recessed into said deflector surface and which act to redirect the stream from said nozzle outlet into a laterally directed spray having said predetermined shape.

20. A stake assembly as set forth in claim 19 wherein said grooves in at least one of said pair of deflector surfaces are formed to produce a generally V-shaped spray pattern.

21. A stake assembly as set forth in claim 20 wherein said V-shaped spray pattern is formed as a pair of laterally diverging elongated generally tear-drop shaped side spray portions laterally spaced by a center generally U-shaped spray portion.

22. A stake assembly as set forth in claim 21 wherein said grooves are formed to divide said stream from said nozzle outlet into two substantially equal portions and to further divide and redirect each of said divided streams into oppositely directed sprays having said generally V-shaped pattern.

23. A mini-sprinkler for use in combination with a ground penetrating support stake and a pressurized source of water, said mini-sprinkler comprising:
a nozzle element including a body having a water flow passage therethrough and an inlet and an outlet;
means for coupling said nozzle body to said water source with said inlet in flow communication therewith;
means for mounting said nozzle element to said support stake such that said nozzle outlet is disposed to eject a stream of water from said source in a generally vertical direction as a pressurized water stream;
a dual pattern reversible deflector element including two oppositely facing and generally horizontally disposed deflector surfaces, each of said deflector surfaces including means for redirecting water from said nozzle outlet into a generally laterally directed water spray of predetermined shape; and
means for releasably coupling said dual pattern deflector element to said nozzle element with one of said two oppositely facing deflector surfaces disposed to overlie said nozzle outlet and to intercept said water stream ejected therefrom.

24. A mini-sprinkler as set forth in claim 23 wherein said predetermined shape produced by said means for redirecting water from said nozzle outlet of at least one of said two deflector surfaces is a generally V-shaped spray pattern.

25. A mini-sprinkler as set forth in claim 24 wherein said V-shaped spray pattern is formed as a pair of laterally diverging elongated generally tear-drop shaped side spray portions laterally spaced by a center generally U-shaped spray portion.

26. A mini-sprinkler as set forth in claim 25 wherein said one of said deflector surfaces is formed with groove means recessed into said surface for redirecting the stream from said nozzle outlet into a laterally directed spray having said predetermined shape.

27. A mini-sprinkler as set forth in claim 26 wherein said groove means include means for dividing said stream from said nozzle outlet into two substantially equal portions and to further divide and redirect each of said divided streams into oppositely directed sprays having said generally V-shaped pattern.

28. A mini-sprinkler as set forth in claim 26 wherein said groove means include a pair of elongated side grooves formed in said one of said deflector surfaces and extending outwardly from adjacent the center thereof, said elongated side grooves each being formed to diverge from the center to produce said generally tear-drop shaped side sprays, and means for substantially uniformly distributing said water stream from said nozzle outlet between each of said side grooves.

29. A mini-sprinkler as set forth in claim 28 wherein said groove means further includes a center, generally fan-shaped grooved formed between said side grooves, said center groove being formed to produce said generally U-shaped center spray portion between said elongated tear-drop shaped side spray portions.

30. A mini-sprinkler as set forth in claim 29 wherein each of said side grooves is formed by a pair of laterally spaced, generally parallel side walls and a sloping bottom wall, said bottom wall extending more deeply into said one of said deflector surfaces in the direction of divergence.

31. A mini-sprinkler as set forth in claim 30 wherein said center generally fan-shaped groove is formed by a pair of laterally spaced diverging side walls and a sloping bottom wall, each of said center groove side walls cooperating with one of said side walls of said side grooves to divide water redirected from said stream so that a greater amount of water is redirected to each of said side grooves than to said center groove.

32. A mini-sprinkler as set forth in claim 31 wherein said one of said deflector surfaces includes two sets of substantially identical groove means extending in opposite directions from adjacent said center, each of said sets of groove means redirecting said water stream from said nozzle outlet generally laterally from said deflector element as said generally V-shaped spray, and means for substantially equally dividing said water stream from said nozzle outlet between each of said sets of groove means.

33. A deflector for intercepting a stream of pressurized water ejected from a generally vertically disposed nozzle outlet and redirecting the water as a spray projected laterally outwardly of the nozzle outlet, said deflector comprising:
a generally horizontal deflector surface disposed to intercept said stream from said nozzle outlet;
groove means formed in said deflector surface for redirecting said intercepted stream into a generally V-shaped spray pattern and disbursing said water spray laterally outwardly away from said deflector, said V-shaped spray pattern being formed as a pair of laterally diverging elongated generally tear-drop shaped side spray portions laterally spaced by a center generally U-shaped spray portion.

34. A deflector as set forth in claim 33 wherein said groove means include a pair of elongated side grooves formed in said deflector surface and extending outwardly from adjacent the center of said surface, said elongated side grooves each being formed to diverge from the center to produce said generally tear-drop shaped side sprays, and means for substantially uniformly distributing said intercepted water between each of said side grooves.

35. A deflector as set forth in claim 34 wherein said groove means further includes a center, generally fan-shaped grooved formed between said side grooves, said center groove being formed to produce said generally U-shaped center spray portion between said elongated tear-drop shaped side spray portions.

36. A deflector as set forth in claim 35 wherein each of said side grooves is formed by a pair of laterally spaced, generally parallel side walls and a sloping bottom wall, said bottom wall extending more deeply into said deflector surface in the direction of divergence.

37. A deflector as set forth in claim 36 wherein said center generally fan-shaped groove is formed by a pair of laterally spaced diverging side walls and a sloping bottom wall, each of said center groove side walls cooperating with one of said side walls of said side grooves to divide water redirected from said stream so that a greater amount of water is redirected to each of said side grooves than to said center groove.

38. A deflector as set forth in claim 37 wherein said deflector surface includes two sets of substantially identical groove means extending in opposite directions from adjacent said center, each of said sets of groove means redirecting said intercepted water generally laterally from said deflector element as said generally V-shaped spray, and means for substantially equally dividing said intercepted water between each of said sets of groove means.

39. A deflector as set forth in claim 38 wherein said deflector is formed of molded plastic material.

40. In combination with a mini-sprinkler of the type including a nozzle having an outlet for projecting a stream of pressurized water in a generally vertical direction, a dual pattern reversible deflector comprising:
a deflector body having two oppositely facing and generally horizontally disposed deflector surfaces, each of said deflector surfaces including groove means for redirecting said stream from said nozzle outlet into a generally laterally directed spray of predetermined shape; and
means for releasably coupling said deflector body to said mini-sprinkler nozzle with one of said two deflector surfaces disposed in spaced, overlying relation with said nozzle outlet to intercept said stream and redirect said stream into said spray of predetermined shape.

41. The combination as set forth in claim 40 wherein each of said groove means of each of said two deflector surfaces redirects said stream into a spray of substantially the same predetermined shape.

42. The combination as set forth in claim 40 wherein each of said groove means of each of said two deflector surfaces redirects said stream into a spray of substantially different predetermined shape.

43. The combination as set forth in claim 40 wherein said predetermined shape produced by said groove means of at least one of said two deflector surfaces has a generally V-shaped pattern.

44. The combination as set forth in claim 43 wherein said generally V-shaped pattern is formed as a pair of laterally diverging elongated generally tear-drop shaped side spray portions laterally spaced by a center generally U-shaped spray portion.

* * * * *

REEXAMINATION CERTIFICATE (2470th)
United States Patent [19]
Christen et al.

[11] B1 5,158,231
[45] Certificate Issued Feb. 7, 1995

[54] MINI-SPRINKLER STAKE ASSEMBLY AND MINI-SPRINKLER UNIT AND DEFLECTOR THEREFORE

[75] Inventors: Hans D. Christen, La Verne; Howard E. Thornton, Glendora, both of Calif.

[73] Assignee: Rain Bird Sprinkler Mfg. Corp., Glendora, Calif.

Reexamination Request:
No. 90/003,124, Jul. 9, 1993

Reexamination Certificate for:
Patent No.: 5,158,231
Issued: Oct. 27, 1992
Appl. No.: 719,747
Filed: Jun. 24, 1991

[51] Int. Cl.⁶ .................. B05B 1/26; B05B 15/00
[52] U.S. Cl. ................... 239/276; 239/280; 239/498; 239/522; 239/DIG. 1; 239/390
[58] Field of Search .............. 239/273, 276, 280, 282, 239/283, 498, 500, 504, 518, 524, 522, 523, DIG. 1, 390

[56] References Cited
U.S. PATENT DOCUMENTS

| | | |
|---|---|---|
| 1,034,613 | 8/1912 | Godfree et al. . |
| 1,405,810 | 2/1922 | Wilkie . |
| 1,639,162 | 8/1927 | Brooks . |
| 1,913,278 | 6/1933 | Ivey . |
| 2,711,925 | 6/1955 | King . |
| 4,660,765 | 4/1987 | Rosenberg . |

FOREIGN PATENT DOCUMENTS

| | | |
|---|---|---|
| 1124211 | 10/1956 | France . |
| 9990 | of 1912 | United Kingdom . |
| 975101 | 11/1982 | U.S.S.R. . |

OTHER PUBLICATIONS

Apr., 1985 Maxijet Product Information Sheet—Clip Stake.
1986 Maxijet Promotional Brochure #MJ-6.
Jul., 1990 Maxijet Product Catalog.

*Primary Examiner*—Andres Kashnikow

[57] ABSTRACT

A mini-sprinkler stake assembly including an elongated ground penetrating stake having an adapter for permitting easy and reliable mounting and replacement of mini-sprinkler units. A new and improved mini-sprinkler unit having a novel tree deflector is also disclosed, the mini-sprinkler unit having a separable nozzle element and dual pattern deflector element, one deflector surface of which includes a recessed for producing a generally V-shaped spray pattern for effectively and efficiently watering the root zone area of a tree.

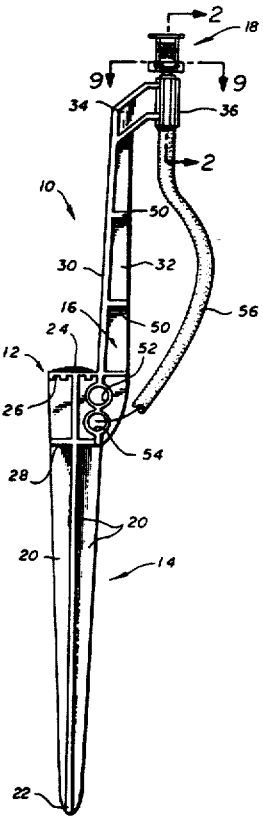

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 33-39 is confirmed.

Claims 1, 4, 14, 15, 18-20, 23, 24 and 40-43 are cancelled.

Claims 2, 5, 6, 16, 21, 25 and 44 are determined to be patentable as amended.

Claims 3, 7-13, 17, 22 and 26-32, dependent on an amended claim, are determined to be patentable.

2. *A mini-sprinkler irrigation stake assembly for use in spraying water over the ground from a supply tube coupled with a source of pressurized water, said stake assembly comprising:*

*an elongated support stake having a ground penetrating portion adapted to be embedded in the ground and a mini-sprinkler support portion adapted to project above the ground, said support portion including a generally C-shaped elongated support channel;*

*a tubular mounting adapter dimensioned to be releasably received and retained in said C-shaped channel and including an inlet end portion adapted to be coupled with said supply tube and an outlet end portion projecting above said C-shaped channel;*

*a mini-sprinkler unit for receiving pressurized water and ejecting said water outwardly away from said unit as a water spray of predetermined shape; and*

*means for releasably coupling said mini-sprinkler unit to said outlet end portion of said adapter* [A stake assembly as set forth in claim 1 wherein said means for releasably coupling comprises] *comprising* a twist-lock coupling formed by cooperating means on said outlet end portion of said adapter and on said mini-sprinkler unit[.] *whereby water received by said adapter from said supply tube is communicated to said mini-sprinkler unit and ejected thereby over the ground with said predetermined shape.*

5. *A mini-sprinkler irrigation stake assembly for use in spraying water over the ground from a supply tube coupled with a source of pressurized water, said stake assembly comprising:*

*an elongated support stake having a ground penetrating portion adapted to be embedded in the ground and a mini-sprinkler support portion adapted to project above the ground, said support portion including a generally C-shaped elongated support channel;*

*a tubular mounting adapter formed of relatively soft polypropylene plastic material and dimensioned to be releasably received and retained in said C-shaped channel and including an inlet end portion adapted to be coupled with said supply tube and an outlet end portion projecting above said C-shaped channel;*

*a mini-sprinkler unit* [A stake assembly as set forth in claim 4 wherein said] *formed of relatively hard Acetal plastic material* [is Acetal.] *for receiving pressurized water and ejecting said water outwardly away from said unit as a water spray of predetermined shape; and*

*means for releasably coupling said mini-sprinkler unit to said outlet end portion of said adapter whereby water received by said adapter from said supply tube is communicated to said mini-sprinkler unit and ejected thereby over the ground with said predetermined shape.*

6. *A mini-sprinkler irrigation stake assembly for use in spraying water over the ground from a supply tube coupled with a source of pressurized water, said stake assembly comprising:*

*an elongated support stake having a ground penetrating portion adapted to be embedded in the ground and a mini-sprinkler support portion adapted to project above the ground, said support portion including a generally C-shaped elongated support channel;*

*a tubular mounting adapter dimensioned to be releasably received and retained in said C-shaped channel and including an inlet end portion adapted to be coupled with said supply tube and an outlet end portion projecting above said C-shaped channel* [A stake assembly as set forth in claim 1 wherein], *said adapter* [is] *being dimensioned to be snap-fit into said support channel, and includes alignment means for preventing movement of said adapter relative to said support channel when supported therein*[.]*;*

*a mini-sprinkler unit for receiving pressurized water and ejecting said water outwardly away from said unit as a water spray of predetermined shape; and*

*means for releasably coupling said mini-sprinkler unit to said outlet end portion of said adapter whereby water received by said adapter from said supply tube is communicated to said mini-sprinkler unit and ejected thereby over the ground with said predetermined shape.*

16. *A mini-sprinkler irrigation stake assembly for use in spraying water over the ground from a supply tube coupled with a source of pressurized water, said stake assembly comprising:*

*an elongated support stake having a ground penetrating portion adapted to be embedded in the ground and a mini-sprinkler support portion adapted to project above the ground, said support portion including a generally C-shaped elongated support channel;*

*a tubular mounting adapted dimensioned to be releasably received and retained in said C-shaped channel and including an inlet end portion adapted to be coupled with said supply tube and an outlet end portion projecting above said C-shaped channel;*

*a mini-sprinkler unit for receiving pressurized water and ejecting said water outwardly away from said unit as a water spray of predetermined shape said mini-sprinkler unit including a nozzle element releasably coupled to a deflector element, said nozzle element including an outlet opening for ejecting a water stream in a generally vertical direction, and said deflector element being disposed to overlie said nozzle outlet and intercept said stream, said deflector element acting to redirect said stream laterally of said stake as a water spray having a generally V-shaped spray pat-*

*term,* [A stake assembly as set forth in claim 15 wherein] said V-shaped spray pattern [is] *being formed as a pair of laterally diverging elongated generally tear-drop shaped side spray portions laterally spaced by a center generally U-shaped spray portion*[.]; *and*

*means for releasably coupling said mini-sprinkler unit to said outlet end portion of said adapter whereby water received by said adapter from said supply tube is communicated to said mini-sprinkler unit and ejected thereby over the ground with said predetermined shape.*

21. *A mini-sprinkler irrigation stake assembly for use in spraying water over the ground from a supply tube coupled with a source of pressurized water, said stake assembly comprising:*

*an elongated support stake having a ground penetrating portion adapted to be embedded in the ground and a mini-sprinkler support portion adapted to project above the ground, said support portion including a generally C-shaped elongated support channel;*

*a tubular mounting adapter dimensioned to be releasably received and retained in said C-shaped channel and including an inlet end portion adapted to be coupled with said supply tube and and outlet end portion projecting above said C-shaped channel;*

*a mini-sprinkler unit for receiving pressurized water and ejecting said water outwardly away from said unit as a water spray of predetermined shape said mini-sprinkler unit including a nozzle element releasably coupled to a deflector element, said nozzle element including an outlet opening for ejecting a water stream in a generally vertical direction, and said deflector element being disposed to overlie said nozzle outlet and intercept said stream, said deflector element acting to redirect said stream laterally of said stake as a water spray of predetermined shape, said deflector element including a pair of oppositely directed deflector surfaces, said deflector element being reversible with respect to said nozzle outlet to position one or the other of said opposed deflectors surfaces in a position to intercept said stream, each of said deflector surfaces being formed with grooves recessed into said deflector surface and which act to redirect the stream from said nozzle outlet into a laterally directed spray having said predetermined shape, said grooves in at least one of said pair of deflector surfaces being formed to produce a generally V-shaped spray pattern,* [A stake assembly as set forth in claim 20 wherein] said V-shaped spray pattern [is] *being formed as a pair of laterally diverging elongated generally tear-drop shaped side spray portions laterally spaced by a center generally U-shaped spray portion*[.]; *and*

*means for releasably coupling said mini-sprinkler unit so said outlet end portion of said adapter whereby water received by said adapter from said supply tube is communicated to said mini-sprinkler unit and ejected thereby over the ground with said predetermined shape.*

25. *A mini-sprinkler for use in combination with a ground penetrating support stake and a pressurized source of water, said mini-sprinkler comprising:*

*a nozzle element including a body having a water flow passage therethrough and an inlet and an outlet;*

*means for coupling said nozzle body to said water source with said inlet in flow communication therewith;*

*means for mounting said nozzle element to said support stake such that said nozzle outlet is disposed to eject a stream of water from said source in a generally vertical direction as a pressurized water stream;*

*a dual pattern reversible deflector element including two oppositely facing and generally horizontally disposed deflector surfaces, each of said deflector surfaces including means for redirecting water from said nozzle outlet into a generally laterally directed water spray of predetermined shape of at least one of said two deflector surfaces being a generally V-shaped spray pattern* [A mini-sprinkler as set forth in claim 24 wherein] said V-shaped spray pattern [is] *being formed as a pair of laterally diverging elongated generally tear-drop shaped side spray portions laterally spaced by a center generally U-shaped spray portion*[.]; *and*

*means for releasably coupling said dual pattern deflector element to said nozzle element with one of said two oppositely facing deflector surfaces disposed to overlie said nozzle outlet and to intercept said water stream ejected therefrom.*

44. *In combination with a mini-sprinkler of the type including a nozzle having an outlet for projecting a stream of pressurized water in a generally vertical direction, a dual pattern reversible deflector comprising:*

*a deflector body having two oppositely facing and generally horizontally disposed deflector surfaces, each of said deflector surfaces including groove means for redirecting said stream from said nozzle outlet into a generally laterally directed spray of predetermined shape, said predetermined shape produced by said groove means of at least one of said two deflector surfaces being a generally V-shaped pattern* [The combination as set forth in claim 43 wherein said generally V-shaped pattern is] *formed as a pair of laterally diverging elongated generally tear-drop shaped side spray portions laterally spaced by a center generally U-shaped spray portion*[.]; *and*

*means for releasably coupling said deflector body to said mini-sprinkler nozzle with one of said two deflector surfaces disposed in spaced, overlying relation with said nozzle outlet to intercept said stream and redirect said stream into said spray of predetermined shape.*

* * * * *